(12) United States Patent
Lee

(10) Patent No.: US 10,884,451 B2
(45) Date of Patent: *Jan. 5, 2021

(54) SYSTEM AND METHODS FOR COMPLETING A CASCADED CLOCK RING BUS

(71) Applicant: DeGirum Corporation, Menlo Park, CA (US)

(72) Inventor: Winston Lee, Palo Alto, CA (US)

(73) Assignee: DeGirum Corporation, Campbell, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 15/967,990

(22) Filed: May 1, 2018

(65) Prior Publication Data

US 2019/0339733 A1    Nov. 7, 2019

(51) Int. Cl.
*H04L 12/42* (2006.01)
*G06F 1/12* (2006.01)

(52) U.S. Cl.
CPC .............. *G06F 1/12* (2013.01); *H04L 12/422* (2013.01)

(58) Field of Classification Search
CPC .................................................... H04L 12/422
See application file for complete search history.

(56) References Cited

U.S. PATENT DOCUMENTS

| | | |
|---|---|---|
| 5,426,756 A | 6/1995 | Shyi et al. |
| 5,920,267 A | 7/1999 | Tattersall et al. |
| 6,405,269 B1 | 6/2002 | Camilleri et al. |
| 6,529,971 B1 | 3/2003 | Thiesfeld |
| 6,593,792 B2 | 7/2003 | Fuji |
| 6,724,846 B1 * | 4/2004 | Lo .............................. G06F 5/16 375/354 |
| 6,937,624 B1 | 8/2005 | Gavin |
| 7,227,920 B2 | 6/2007 | Heikkila |
| 7,925,803 B2 | 4/2011 | Mangano et al. |
| 7,940,100 B2 | 5/2011 | Keskin et al. |
| 8,136,790 B2 | 3/2012 | Doubler et al. |
| 8,493,043 B2 | 7/2013 | Le et al. |
| 8,995,473 B2 | 3/2015 | Zheng et al. |
| 9,678,529 B2 | 6/2017 | Hlond et al. |
| 2003/0172190 A1 * | 9/2003 | Greenblat ............. H04L 12/422 709/251 |
| 2004/0050238 A1 | 3/2004 | Okamura |

* cited by examiner

*Primary Examiner* — Albert Wang
(74) *Attorney, Agent, or Firm* — Bever, Hoffman & Harms, LLP

(57) ABSTRACT

A cascaded clock ring network includes a clock path that transmits a source clock through series-connected processing nodes, from a first processing node to a last processing node. A data path transmits data through the processing nodes in response to the transmitted source clock, from the first processing node to the last processing node. The last processing node provides the transmitted source clock as an end clock signal, and provides the transmitted data as end data values. The end data values are written into a FIFO memory in response to the end clock signal. The end data values are subsequently read from the FIFO memory using the source clock signal, and are provided to the first processing node. A synchronizing circuit ensures that a plurality of end data values are initially written into the FIFO memory before an end data value is read from the FIFO memory.

33 Claims, 13 Drawing Sheets

SYSTEM AND METHODS FOR COMPLETING A CASCADED CLOCK RING BUS

FIELD OF THE INVENTION

The present invention relates to clocking operations performed in a cascaded clock ring network. More specifically, the present invention relates to the resynchronization of a clock signal that has completed a round-trip traversal of an entire cascaded clock ring network.

RELATED ART

FIG. 1 is a block diagram of a conventional synchronous ring network 100 that includes a plurality of processing nodes 101-108. Nodes 101-108 include node processing units 111-118, respectively, multiplexers 121-128, respectively, and flip-flops 131-138, respectively. Nodes 101-108 are connected in a ring, wherein the data outputs D1, D2, D3, D4, D5, D6, D7 and D8 of flip-flops 131, 132, 133, 134, 135, 136, 137 and 138 are provided to inputs of multiplexers 122, 123, 124, 125, 126, 127, 128 and 121, respectively, by data buses 141, 142, 143, 144, 145, 146, 147 and 148, respectively. The inputs of flip-flops 131-138 are coupled to receive the outputs of multiplexers 121-128, respectively. Note that multiplexers 121-128 also receive data inputs from node processing units 111-118, respectively. The outputs of flip-flops 131-138 are also provided to node processing units 111-118, respectively.

Flip-flops 131-138 are clocked using a balanced clock tree that includes a clock source 150 and clock driver circuits 151-165. The balanced clock tree is constructed so the clock signal C0 provided by the clock source 150 is routed through the various clock drivers 151-165 as illustrated, thereby providing the clock signals C1-C8 to flip-flops 131-138, respectively, wherein the clock signals C1-C8 transition in phase (i.e., at the same time). The balanced clock tree produces a maximum operating frequency of the synchronous ring network 100 by minimizing set up and hold time skew in the system. In this balanced clock tree ring network 100, there is no notion of a 'starting' clock signal and an 'ending' clock signal on the ring.

FIG. 2 is a block diagram of a conventional cascaded clock ring network 200 that includes a plurality of processing nodes 201-208. Processing nodes 201-208 include node processing units 111-118, respectively, multiplexers 121-128, respectively, and flip-flops 131-138, respectively, which are described above in connection with the synchronous ring network 100 of FIG. 1. In addition, processing nodes 201-208 include clock driver circuits 211-218, respectively, and clock driver circuits 221-228, respectively.

Processing nodes 201-208 are connected in a ring, wherein the data outputs D1', D2', D3', D4', D5', D6', D7' and $D_{END}$ of flip-flops 131, 132, 133, 134, 135, 136, 137 and 138 are provided to inputs of multiplexers 122, 123, 124, 125, 126, 127, 128 and 121, respectively, by data buses 141, 142, 143, 144, 145, 146, 147 and 148, respectively.

Clock source 150 provides an input clock signal C0 to clock driver circuits 211 and 221, wherein clock driver circuit 211 provides a clock signal $C_{FF1}$ to clock flip-flop 131, and clock driver circuit 212 provides a cascaded clock signal C1' to clock driver circuits 212 and 222 of downstream processing node 201. The cascaded clock signal C1' propagates through clock driver circuits 222-228 as cascaded clock signals C2', C3', C4', C5', C6', C7' and $C_{END}$, respectively. Clock driver circuits 212-218 provide clock signals $C_{FF2}$-$C_{FF8}$ to flip-flops 132-138, respectively, in response to the received cascaded clock signals C1'-C7', respectively. In the manner described above, processing nodes 201-208 are configured as a daisy-chain with data and clock signals passing from one processing node to the next. The ring is completed when the data $D_{END}$ from the last processing node 208 is provided to the first processing node 201. If the distance between adjacent processing nodes is long, the data and clock signals transmitted between the adjacent processing nodes can be buffered, with the same number of buffer stages located along both the data and clock signal paths to preserve the data/clock phase relationship and allow for high frequency operation.

In designs where the processing nodes span a large die area, it may be advantageous to use the cascaded clock ring network 200, because it is very difficult to balance the clock tree of the synchronous ring network 100 over a large die area. That is, data and clock skew may not be manageable by the clock tree, thereby limiting the operating frequency of a synchronous ring network 100. Moreover, the power requirements of a large clock tree may be excessively high. With the cascaded clock ring system 200, data and clock skew is much more localized and manageable. Operating frequency should be much higher and power consumption should be lower in the cascaded clock ring system 200, which does not require a large clock tree.

However, in the cascaded clock ring system 200, a problem exists when data is transferred from the last processing node 208 to the first processing node 201. The first processing node 201 is different from the other processing nodes 202-208 because the first processing node 201 receives its input clock signal C0 from a clock source 150, rather than from the preceding processing node 208. The source clock signal C0 is cascaded from node to node as described above. The data $D_{END}$ sent from the last processing node 208 to the first processing node 201 comes from the clock domain of the last processing node 208, while the clock signal $C_{FF1}$ used to latch data into the flip-flop 131 of the first processing node 201 comes from the clock source 150. Because the node clock signals C1'-C7' are cascaded from the first processing node 201, the phase difference between the first node clock signal C0 and the last node clock signal $C_{END}$ is unknown. This phase difference varies with frequency, temperature, voltage, power noise, clock jitter and other environmental factors. As a result, the setup and hold time of the flip flop 131 in the first processing node 201 is unknown. For all other processing nodes 202-208, there is no such conflict as the clock for the data flip flop in each processing node just comes from the preceding processing node, and has a known and fixed phase relationship. Note that if the source clock signal C0 and the clock signal $C_{END}$ from the last node 208 are in phase, there would be no issue. However, this is not naturally the case.

One possible solution is to use a phase locked loop (PLL) to generate the source clock signal C0 under the constraint that the frequency generated will produce little or no phase delay between the clock signal $C_{END}$ provided by the last node 208 and the source clock signal C0. In general, the allowed frequencies of the source clock signal C0 are integer multiples of the fundamental frequency of the clock loop. Drawbacks to this solution include: difficult design, the design may require a large layout area, which is not suitable for chips with many ring buses, the loop response may not be suitable for implementing voltage and frequency scaling, and the solution only allows for coarse operating frequency resolution. Moreover, the use of a PLL requires the implementation of analog circuitry in an area that includes dense digital circuitry. The digital circuitry injects significant noise to the sensitive analog circuitry, increasing jitter. In order to minimize this, the analog circuitry and digital circuitry are provided with separate voltage supplies. Adding a separate voltage supply bus undesirably increases the required chip layout area and introduces routing difficulties, as well as potentially compromising the robustness of one of the voltage supplies. In addition, the digital and analog circuits must be separated by a relatively large physical distance, thereby contributing to a larger required layout area.

Another possible solution is to use a delay locked loop (DLL) with a delay line located in the path of the loop. In this solution, a phase detector samples the phases of the source clock signal C1 and the clock signal $C_{END}$, as received at the input of the first node 201 from the output of the last node 208. The variable delay line is adjusted to produce zero phase delay between these two clock signals $C_0$ and $C_{END}$. Drawbacks to this solution include: high design complexity, sensitivity to in-band jitter, the introduction of additional jitter due to power noise, and the fact that frequency and voltage scaling is difficult (as the frequency range is limited by the delay line area and the extra delay introduced).

A method to reliably transfer data around a cascaded clock ring bus is therefore required.

SUMMARY

Accordingly, the present invention provides a cascaded clock ring network that includes a clock signal path that transmits a source clock signal (C0) through a plurality of series-connected processing nodes, from a first processing node to a last processing node. The last processing node provides the transmitted source clock signal as an end clock signal ($C_{END}$). The cascaded clock ring network also includes a data path that transmits data values through the plurality of processing nodes in response to the transmitted source clock signal, from the first processing node to the last processing node. The last processing node provides the transmitted data values as end data values ($D_{END}$). A first-in first-out (FIFO) memory is located between the first and last processing nodes. The end data values $D_{END}$ are written into the FIFO memory in response to the end clock signal $C_{END}$. The end data values $D_{END}$ are subsequently read from the FIFO memory in response to the source clock signal C0, and are provided to the first processing node as resynchronized data values (D0').

In one embodiment, the FIFO memory stores each of the end data values $D_{END}$ for a valid data window period (W1) having a duration equal to the number of FIFO entries multiplied by the period of the end clock signal $C_{END}$. The number of FIFO entries is selected in view of the anticipated phase drift of the clock signals C0 and $C_{END}$ due to clock voltage and temperature variation during operation, as well as the relative jitter of the two clocks signals C0 and $C_{END}$.

In accordance with another aspect of the present invention, a synchronizing circuit ensures that a plurality of end data values $D_{END}$ are initially written into the FIFO memory before an end data value is read from the FIFO memory. The synchronizing circuit can include: a first flip-flop having an input coupled to receive a valid bit that is asserted when a first end data value is written to the FIFO memory, and a second flip-flop coupled in series with the first flip-flop, wherein the asserted valid bit is transferred through the first and second flip-flops in response to the source clock signal. A read control circuit is coupled to receive the asserted valid bit provided by the second flip-flop, wherein the read control circuit initiates read operations to the FIFO memory after receiving the asserted valid bit. In one embodiment, the read control circuit waits a predetermined number of one or more cycles to initiate read operations after receiving the asserted valid bit. The predetermined number of cycles is selected to ensure that read operations are initiated near the center of the valid data window period W1.

In accordance with another embodiment, control circuitry is provided for periodically measuring the delay associated with the clock signal path or the data path of the cascaded clock ring network. If the difference between an initially measured (reference) delay and a subsequently measured delay exceeds a predetermined threshold, the control circuit re-synchronizes the writing and reading of the end data values within the FIFO memory.

Another embodiment includes a method of operating a cascaded clock ring network that includes: (1) transmitting a source clock signal on a clock signal path through a plurality of series-connected processing nodes, from a first processing node to a last processing node, wherein the last processing node provides the transmitted source clock signal as an end clock signal, (2) transmitting data values on a data path through the plurality of processing nodes in response to the transmitted source clock signal, from the first processing node to the last processing node, wherein the last processing node provides the transmitted data values as end data values, (3) writing the end data values to a first-in first-out (FIFO) memory in response to the end clock signal, and (4) reading the end data values previously written to the FIFO memory to the first processing node in response to the source clock signal.

This method can further include storing each of the end data values in the FIFO memory for a valid data window period having a duration equal to the number of entries of the FIFO memory multiplied by the period of the source clock signal.

This method can further include synchronizing the writing and reading of the end data values within the FIFO memory to ensure that a plurality of the end data values are initially written into the FIFO memory before an end data value is read from the FIFO memory. This synchronizing can include activating a valid bit upon writing a first one of the end data values into a first entry of the FIFO memory, and transmitting the activated valid bit through a plurality of flip-flops in response to the source clock signal, thereby providing a resynchronization valid bit. Read operations to the FIFO memory may be initiated in response to the resynchronization valid bit. These read operations may be delayed by one or more cycles of the source clock signal to ensure that the read operations are performed near a center of the valid data window period.

In accordance with another embodiment, the method may additionally include: (1) periodically measuring a delay associated with the clock signal path or the data path, (2) determining whether the periodically measured delay changes by more than a threshold value, and (3) upon determining that the periodically measured delay changes by more than the threshold value, re-synchronizing the writing and reading of the end data values within the FIFO memory.

The present invention will be more fully understood in view of the following description and drawings.

DETAILED DESCRIPTION

In general, the present invention includes a first-in first-out (FIFO) memory structure between the data path of the last processing node of a cascaded clock ring network and the first processing node of the cascaded clock ring network. The FIFO write circuitry and the data input is driven by the output clock signal ($C_{END}$) provided by the last processing node, while the FIFO read circuitry and data output is driven by the source clock signal (C0). The present invention will now be described in more detail.

Figure 1:
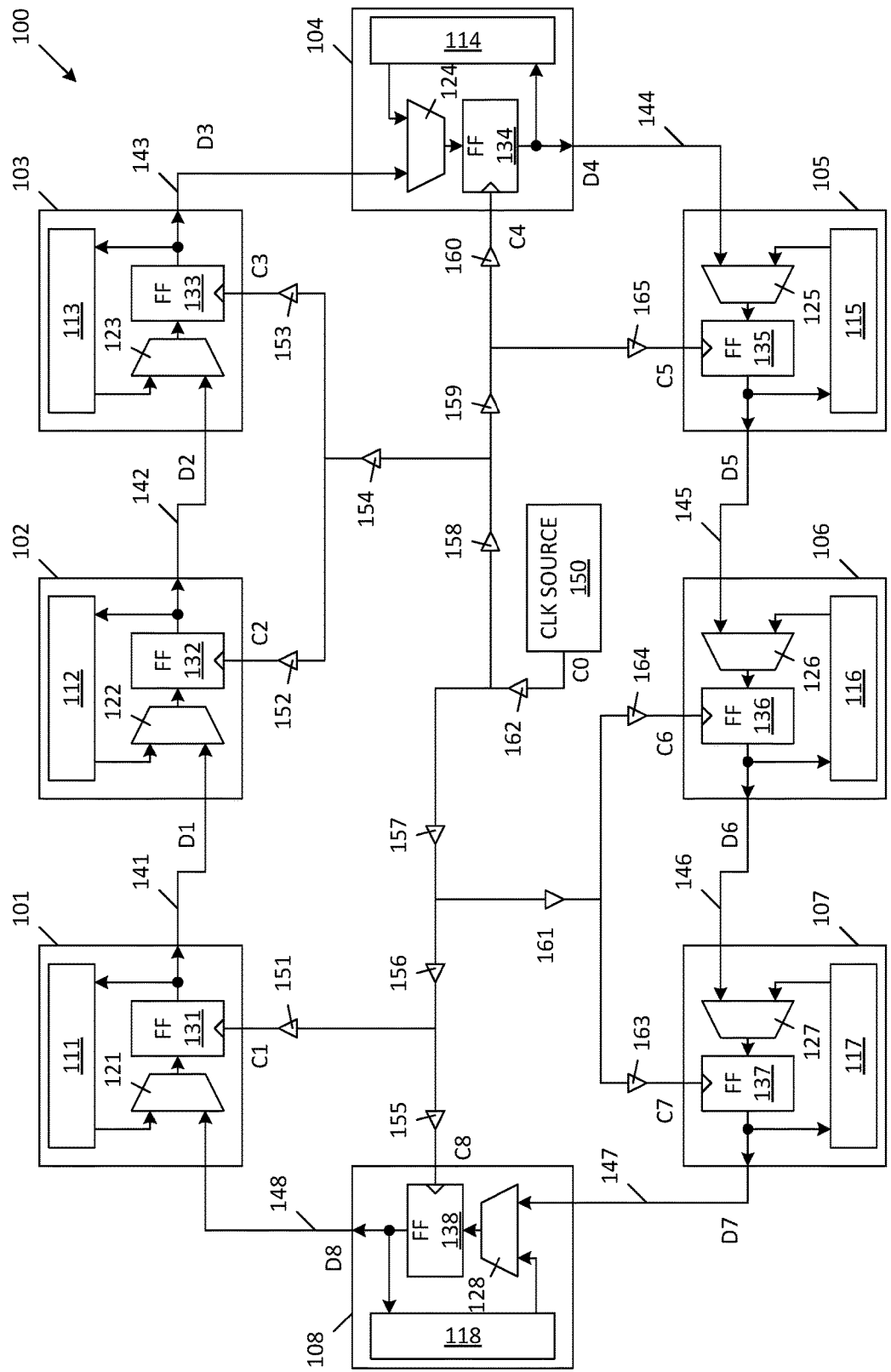
FIG. 1 is a block diagram of a conventional synchronous ring network.
Figure 2:
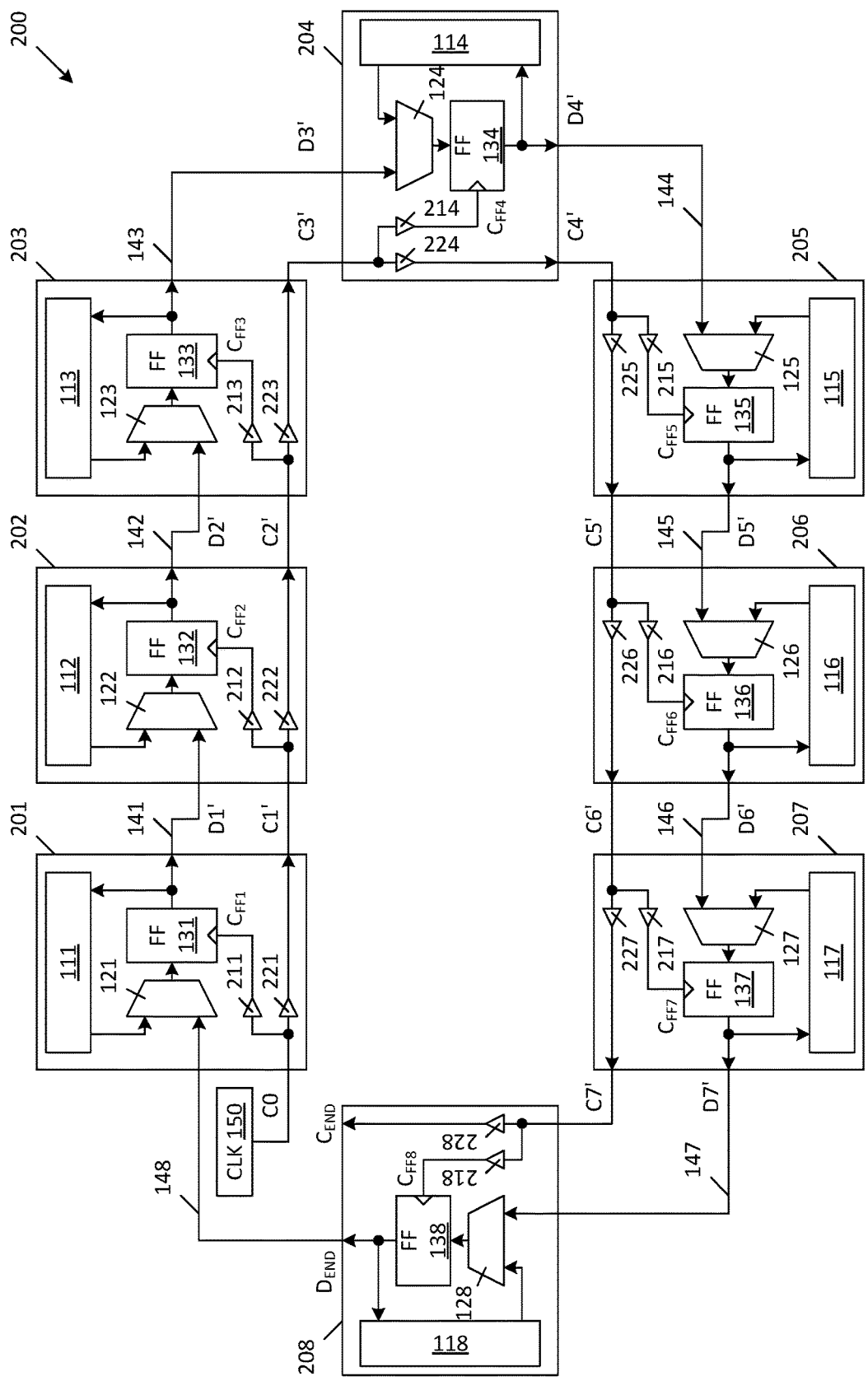
FIG. 2 is a block diagram of a conventional cascaded clock ring network.
Figure 3:
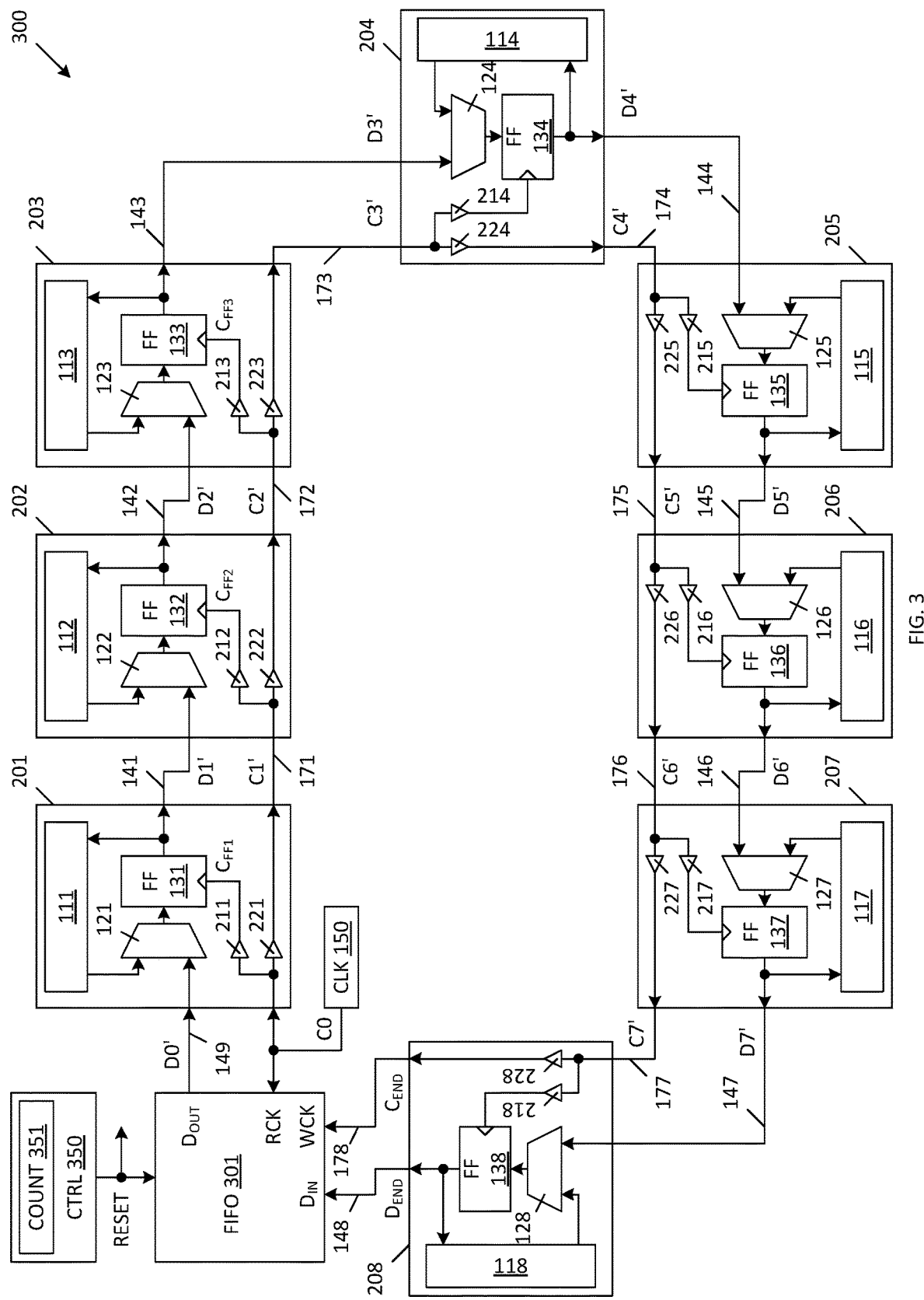
FIG. 3 is a block diagram of a cascaded clock ring network in accordance with one embodiment of the present invention.

FIG. 3 is a block diagram illustrating a cascaded clock ring network 300 in accordance with one embodiment of the present invention. Because cascaded clock ring network 300 is similar to cascaded clock ring network 200 (FIG. 2), similar elements in FIGS. 2 and 3 are labeled with similar reference numbers. Thus, cascaded clock ring network 300 includes clock source 150 and processing nodes 201-208, wherein processing nodes 201-208 include node processing units 111-118, respectively, multiplexers 121-128, respectively, flip-flops 131-138, respectively, clock driver circuits 211-218, respectively, and clock driver circuits 221-228, respectively. Clock driver circuits 221-228 provide cascaded clock signals C1'-C7' and $C_{END}$, respectively, onto clock buses 171-178, respectively, in response to the source clock signal C0 provided by clock source 150, thereby providing a clock signal path. It is understood that clock source 150 may include buffers or other circuitry to condition the source clock signal C0. Clock driver circuits 211-218 provide clock signals $C_{FF1}$-$C_{FF8}$, respectively, to clock flip-flops 131-138, respectively, in response to the clock signals C0 and C1'-C7', respectively. Flip-flops 131-138 provide output data values D1'-D7' and $D_{END}$, respectively, on data buses 141-148, respectively, thereby providing a data path.

Resynchronizing FIFO circuit 301 is coupled to receive the data values $D_{END}$ and the clock signal $C_{END}$ provided by the last processing unit 208 in the ring. Resynchronizing FIFO circuit 301 is also coupled to receive the source clock signal C0 from the clock source 150 and a RESET control signal from ring control circuit 350. In response, resynchronizing FIFO circuit 301 provides data values D0' to multiplexer 121 of the first processing node 201 of the ring (on data bus 149), wherein the data values D0' are resynchronized with the source clock signal C0.

Figure 4:
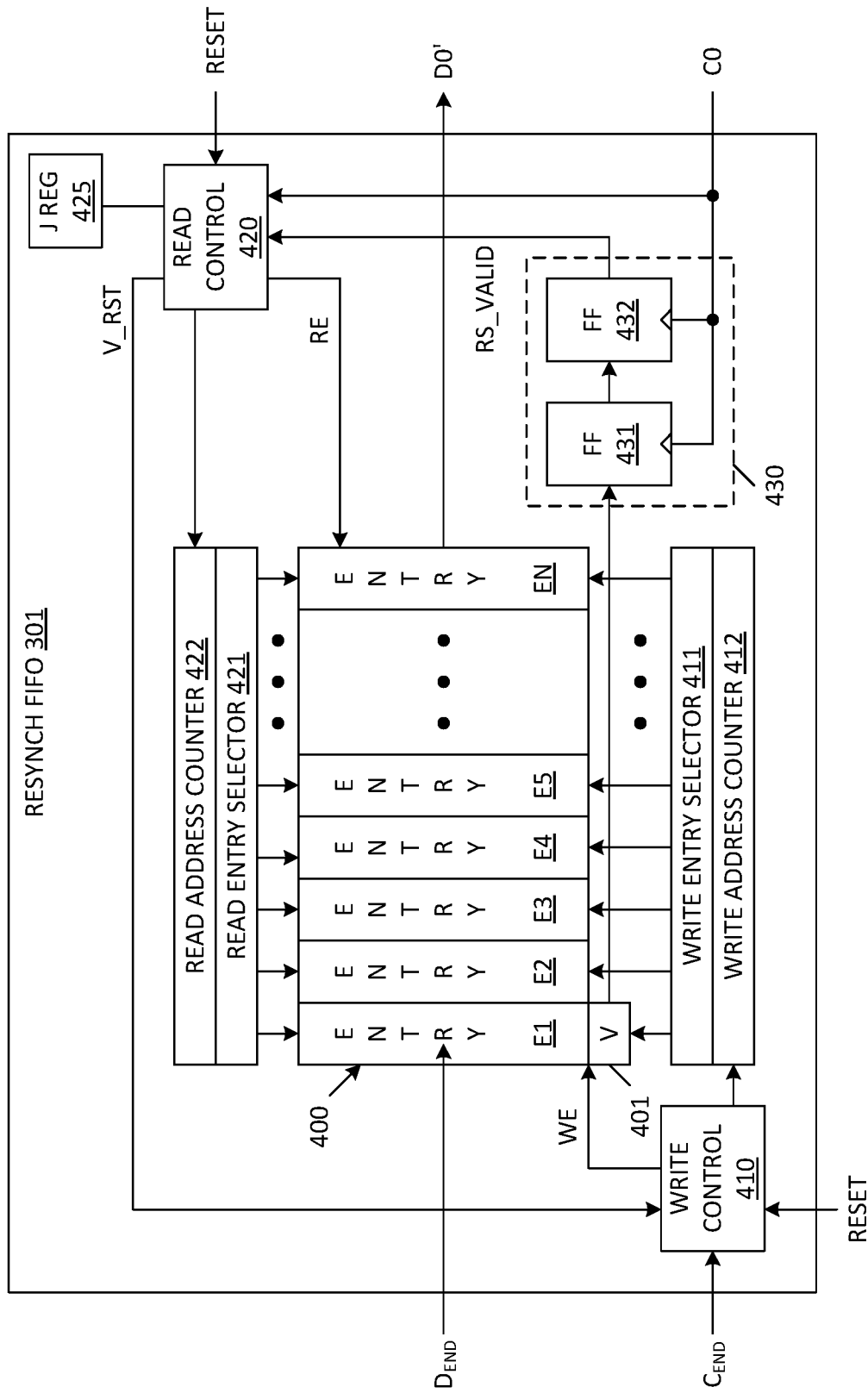
FIG. 4 is a block diagram illustrating the general structure of a resynchronizing FIFO circuit included in the cascaded clock ring network of FIG. 3 in accordance with one embodiment of the present invention.

FIG. 4 is a block diagram illustrating the general structure of resynchronizing FIFO circuit 301 in accordance with one embodiment of the present invention. Resynchronizing FIFO circuit 301 includes N-entry FIFO memory 400, valid bit entry 401, write control circuit 410, write entry selector 411, write address counter 412, read control circuit 420, read entry selector 421, read address counter 422, delay register 425 and synchronizing circuit 430, which includes flip-flops 431-432.

As described in more detail below, resynchronizing FIFO circuit 301 allows data $D_{END}$ received from the last processing node 208 to be 'valid' for more than one clock cycle, essentially increasing the entry valid data window to facility reliable sampling by the source clock C0, which has an unknown and varying phase relative to the incoming data ($D_{END}$) and clock ($C_{END}$) signals. The number of entries in the FIFO circuit 301 determines the duration of the entry valid data window, wherein the required duration is determined by the anticipated phase drift of the clock signals C0 and $C_{END}$ due to clock voltage and temperature variation during operation, as well as the relative jitter of the two clocks signals C0 and $C_{END}$. A critical variable delay value (J) stored in the delay register 425 enables read control circuit 420 to control the placement of the read pulse (ideally near center) relative to the entry valid data window.

Figure 5:
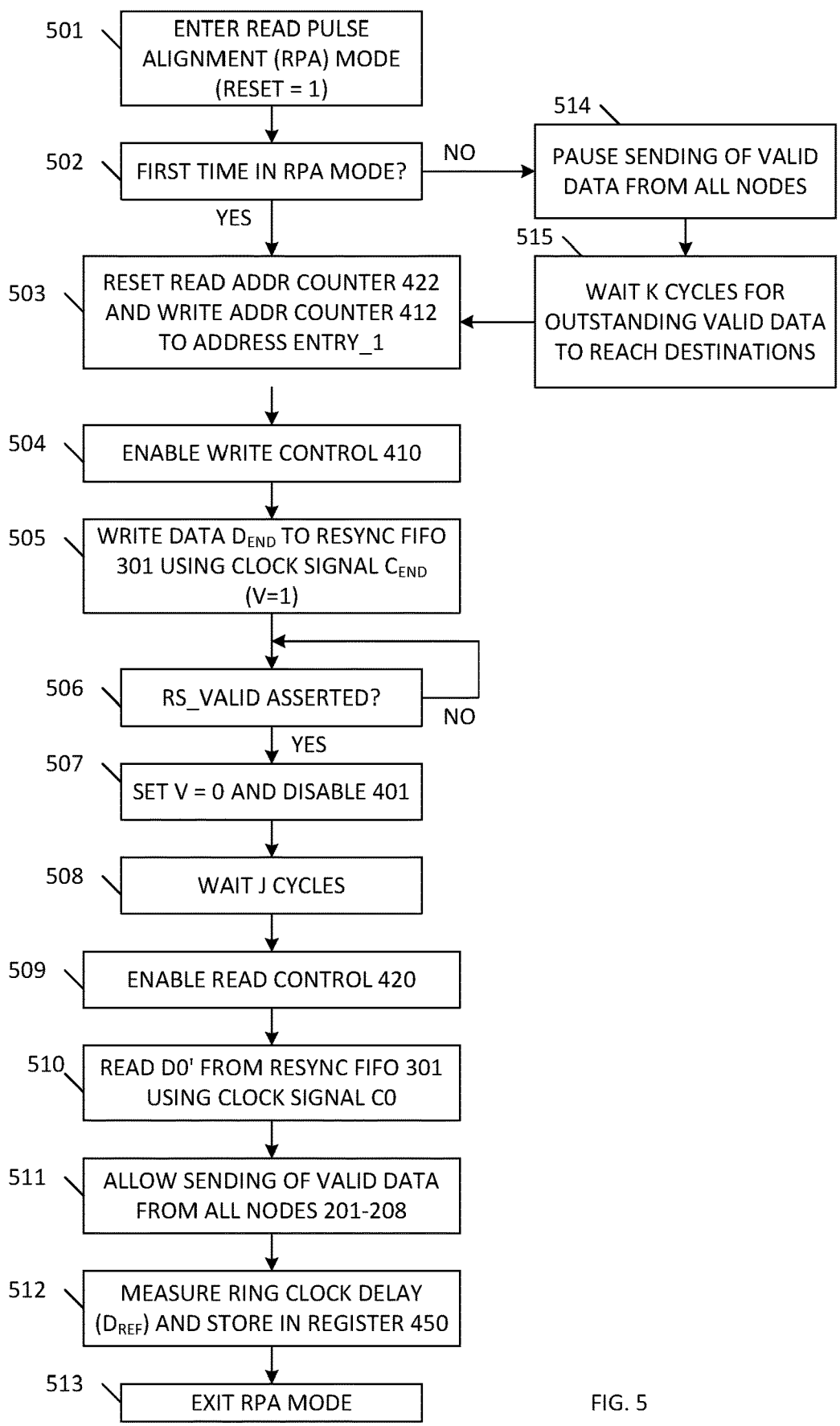
FIG. 5 is a flow diagram illustrating a method for initializing the operation of the resynchronizing FIFO circuit of FIG. 4 in accordance with one embodiment of the present invention.

FIG. 5 is a flow diagram illustrating a method 500 for initializing the operation of resynchronizing FIFO circuit 301 in accordance with one embodiment of the present invention.

Figure 6:
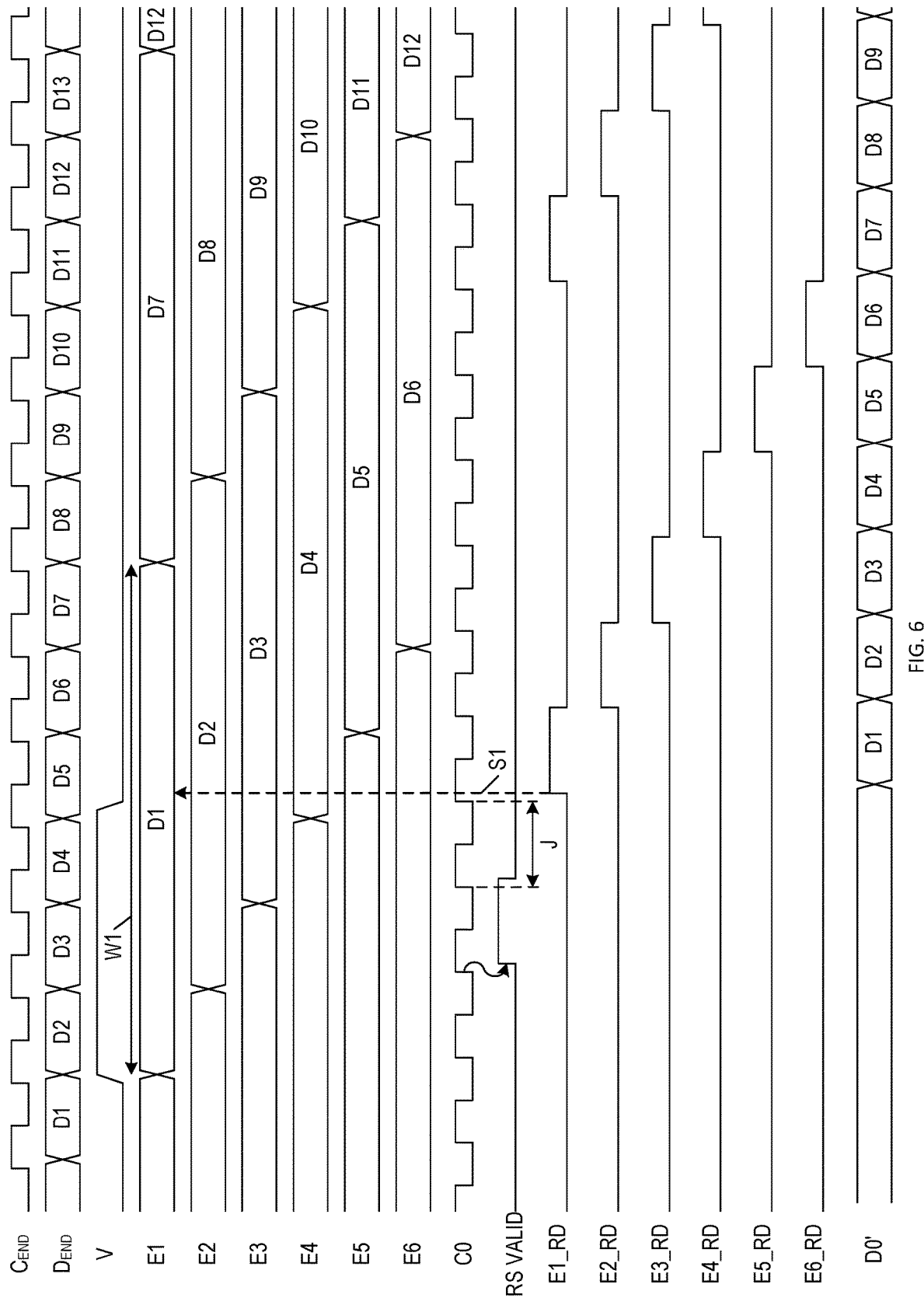
FIG. 6 is a waveform diagram illustrating signals within the resynchronizing FIFO circuit of FIG. 4 the initializing method of FIG. 5.

FIG. 6 is a waveform diagram illustrating signals within resynchronizing FIFO circuit 301 during the initializing method of FIG. 5.

In step 501, control circuit 350 asserts a reset control signal (RESET=1), thereby causing the resynchronization FIFO circuit 301 to enter a read pulse alignment mode, wherein read pulses used to read data from the resynchronizing FIFO circuit 301 are aligned with the source clock signal C0. The RESET signal is provided to processor nodes 111-118 within communication nodes 201-208, respectively, and also to write control circuit 410 and read control circuit 420 within resynchronizing FIFO circuit 301.

If the RESET signal has previously been asserted (e.g., the read pulse alignment mode was previously activated, and data is already being transmitted on the ring network using the results of the previous read pulse alignment) (Step 502, NO branch), then processing proceeds to step 514 wherein processor nodes 111-118 pause the sending of new valid data values on the ring network. Processor nodes 111-118, write control circuit 410 and read control circuit 420 then wait K cycles, wherein the value K is selected to allow all valid data values currently being transmitted on the ring network to propagate to their destination nodes (Step 515). After K cycles elapse, processing proceeds to Step 503.

If the RESET signal has not previously been asserted (i.e., the asserted RESET signal indicates the first time that the read pulse alignment mode is activated), then processing proceeds directly from step 502 to step 503.

In step 503, write control circuit 410 resets the write address counter 412, such that the write address stored by write address counter 412 causes the write entry selector 411 to point to entry E1 (and valid bit 401) of the N-entry FIFO memory 400. In addition, read control circuit 420 resets the read address counter 422, such that the read address stored by the read address counter 422 causes read entry selector 421 to point to entry E1 (and valid bit 401) of the N-entry FIFO memory 400.

Write control circuit 410 is then enabled (step 504), and valid write data value $D_{END}$ provided to resynchronizing FIFO circuit 301 from the last node 208 in the ring network is written to resynchronizing FIFO circuit 301 in response to the corresponding clock signal $C_{END}$ (step 505). Write control circuit 410 asserts a write enable signal WE that causes the first received valid write data value (D1) to be written to entry E1 of FIFO memory 400, and also causes a logic '1' value to be written to the valid (V) bit memory 401 associated with entry E1 (FIG. 6). The write enable signal WE is asserted in synchronism with the received clock signal $C_{END}$, such that write operations to FIFO memory 400 are performed in the clock domain of the last communication node 208.

During successive cycles of the $C_{END}$ signal, subsequently received data signals D2-D12 are sequentially written to the entries of FIFO memory 400. In the embodiment illustrated by FIG. 6, FIFO memory 400 includes six entries (E1-E6), wherein data values D2-D6 are written to FIFO entries E2-E6, respectively, during the next five cycles of the input clock signal $C_{END}$. Write control circuit 410 increments the write address counter 412 with each write operation. After writing data value D6 to the last entry E6 of FIFO memory 400, the write address counter wraps around to a value of '1', such that the next ($7^{th}$) write operation is performed to the first entry E1. Thus, write data values D7-D12 are sequentially written to entries E1-E6, respectively (overwriting previously written data values D1-D6).

As illustrated by FIG. 6, storing data in this manner allows each of the write data values D1-D2 to be stored in FIFO memory for a period of about N (e.g., six) cycles of the input clock signal $C_{END}$. The extended valid data window period W1 for the first data value D1 is labeled in FIG. 6. Although six entries are described in the present example, it is understood that other numbers of entries can be used in other embodiments. The considerations for selecting the number of entries of FIFO memory 400 are described in more detail below. In a particular embodiment, FIFO memory 400 includes 8 or fewer entries.

The valid bit V stored by valid bit memory 401 is provided to an input terminal of flip-flop 431. The output terminal of flip-flop 431 is coupled to the input terminal of flip-flop 432. The output terminal of flip-flop 432 is coupled to read control circuit 420. The signal provided from flip-flop 432 to read control circuit 420 is labeled as the resynchronization valid signal, RS_VALID. Flip-flops 431 and 432 operate in response to the source clock signal C0 (which has the same frequency as the input clock signal $C_{END}$).

After the logic '1' valid bit V has been written to valid bit memory 401, the next rising edge of the source clock signal C0 causes this logic '1' valid bit V to be latched into flip-flop 431. The next rising edge of the source clock signal C0 causes this logic '1' valid bit V to be latched into flip-flop 432. At this time, the flip-flop 432 provides the logic '1' valid bit V to read control circuit 420 (i.e., RS_VALID=1). This transition is illustrated in FIG. 6.

Upon detecting that the RS_VALID signal has transitioned to a logic '1' state (Step 506, Yes branch), read control circuit 420 asserts a valid reset signal (V_RST), which is provided to write control circuit 410. In response to the asserted V_RST signal, write control circuit 410 resets the valid bit V stored in valid bit memory 401 to a logic '0' value, and disables writing to valid bit memory 401 until the next time the read pulse alignment mode is entered (step 507). (Note that prior to RS_VALID being asserted (step 506, No branch), read control circuit 420 waits to detect the assertion of the RS_VALID signal). In an alternate embodiment, write control circuit 410 resets the valid bit V the second time a write operation is performed to the corresponding entry E1 (i.e., during the $7^{th}$ write operation to FIFO memory 400).

After receiving the asserted RS_VALID signal, read control circuit 420 waits for J cycles of the clock signal C0 (or $C_{END}$) to elapse (step 508), wherein J is the value stored by delay register 425. Note that control circuit 350 may determine the value of J, and then write this value to delay register 425. In one embodiment, the value of J is equal to the number of entries (N) of FIFO memory 400 divided by two, minus the number of clock cycles required to resynchronize the asserted valid bit V with the source clock signal C0. In the example of FIG. 6, N=6 and the number of C0 clock cycles required to resynchronize the asserted valid bit V is equal to (because this resynchronization uses two flip flops 431 and 432). As a result, J is equal to 1 (i.e., J=(6/2)−2). This value of J is illustrated in FIG. 6.

After waiting for J cycles, read control circuit 420 is enabled (step 509), and data is read from FIFO memory 400 in response to the source clock signal C0, starting at entry E1 (step 510). Read control circuit 420 asserts a read enable signal RE that causes the first data value (D1) to be read from entry E1 of FIFO memory 400, wherein the read pulse that enables this read operation is shown as E1_RD in FIG. 6. The read pulse E1_RD is asserted at time S1, in synchronism with the source clock signal C0 (such that read operations from FIFO memory 400 are performed in the clock domain of the first communication node 201). The timing of the read operations to entries E1-E6 are illustrated by signals E1_RD to E6_RD, respectively, in FIG. 6.

During successive cycles of the source clock signal C0, data values D2-D12 are sequentially read out of the entries of FIFO memory 400. Read control circuit 420 increments the read address counter 422 with each read operation. After reading data value D6 from the last entry E6 of FIFO memory 400, the read address counter wraps around to a value of '1', such that the next ($7^{th}$) read operation is performed to the first entry E1. In this manner, the data values D1-D12 are sequentially read from FIFO memory 400 during successive cycles of the source clock signal C0. Although the described examples use read address counter 422 and read entry selector 421 to select entries of FIFO memory 400 to be read, and write address counter 412 and write entry selector 411 to select entries of FIFO memory 400 to be written, it is understood that other circuitry, readily known to those of ordinary skill, may be used to generate the read and write addresses used to access FIFO memory 400 in other examples.

Note that the value of J is selected to ensure that the data values D1-D12 stored in FIFO memory 400 are read at sampling points that are near the centers of the data windows associated with the data values. FIG. 6 illustrates the sampling point (S1) at which the data value D1 is read from entry E1 of FIFO memory 400, which is near the center of the data window W1 associated with this data value. There will be a one clock cycle of uncertainty regarding the placement of the sampling point S1 relative to the center of the data window W1 due to the resynchronization of the valid bit V from the $C_{END}$ clock domain to the C0 clock domain.

Advantageously, there is no requirement for empty and full flags for use in connection with FIFO memory 400, since there is a write operation and a read operation performed every clock cycle.

After the resynchronization described above has been completed, control logic 350 enables the sending of valid data from all of the communication nodes 201-208 (step 511).

Control circuit 350 then measures the clock/data delay ($D_{REF}$) associated with cascaded clock ring network 300, and stores the results (Step 512). Control circuit 350 can measure the clock/data delay $D_{REF}$ of ring network 300 in different manners, as described in more detail below. Although the examples provided below describe a single clock delay ($D_{REF}$) measurement, it is understood that multiple clock delay ($D_{REF}$) measurements may be taken, and the average of these multiple measurements may be used to represent the clock delay ($D_{REF}$) value. Such an average may be useful if the clock jitter is greater than the resolution of the measurements.

Figure 7:
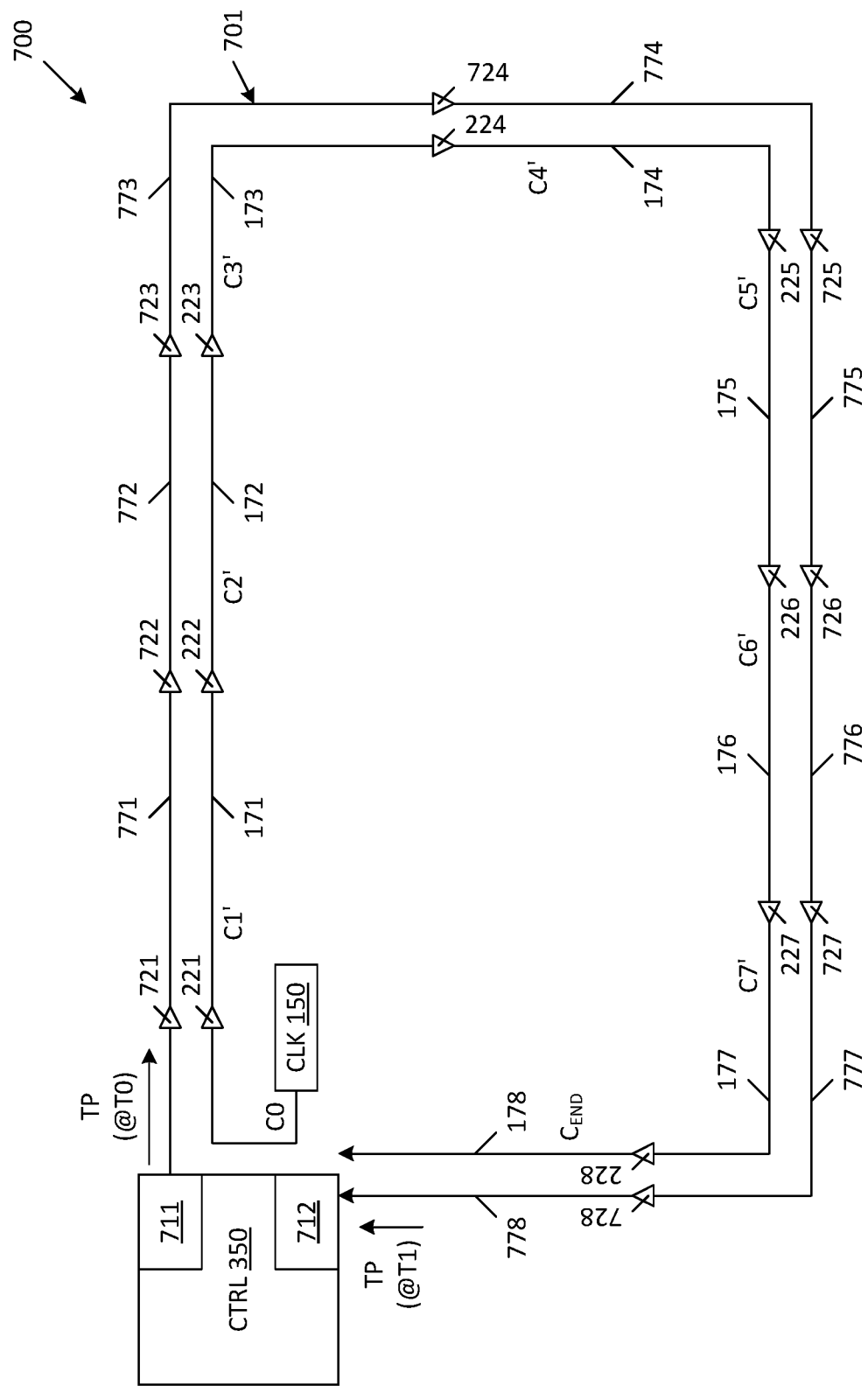
FIG. 7 is a block diagram of a system used for estimating a clock delay ($D_{REF}$) associated with the cascaded clock ring network of FIG. 3 in accordance with one embodiment of the present invention.

FIG. 7 is a block diagram of a system 700 for estimating the clock delay ($D_{REF}$) associated with the ring network 300 in accordance with one embodiment of the present invention. System 700 includes a model ring clock bus 701, which includes clock drivers 721-728 and clock buses 771-778, which are designed to be identical to (i.e., have the same transmission characteristics) as clock drivers 221-228, respectively, and clock buses 171-178, respectively. Control circuit 350 includes a model delay stimulus circuit 711 and a model delay detection circuit 712. At time T0, model delay stimulus circuit 711 transmits a test pulse signal TP onto model ring clock bus 701. This test pulse signal propagates through model ring clock bus 701, and is received by model delay detection circuit 712 at time T1. Control circuit 350, which is located in close proximity to the resynchronizing FIFO circuit 301, calculates the estimated delay $D_{REF}$ of ring network 300 to be equal to T1 minus T0. Advantageously, the estimated clock delay $D_{REF}$ can be calculated by system 700 without interrupting the operation of ring network 300.

Figure 8:
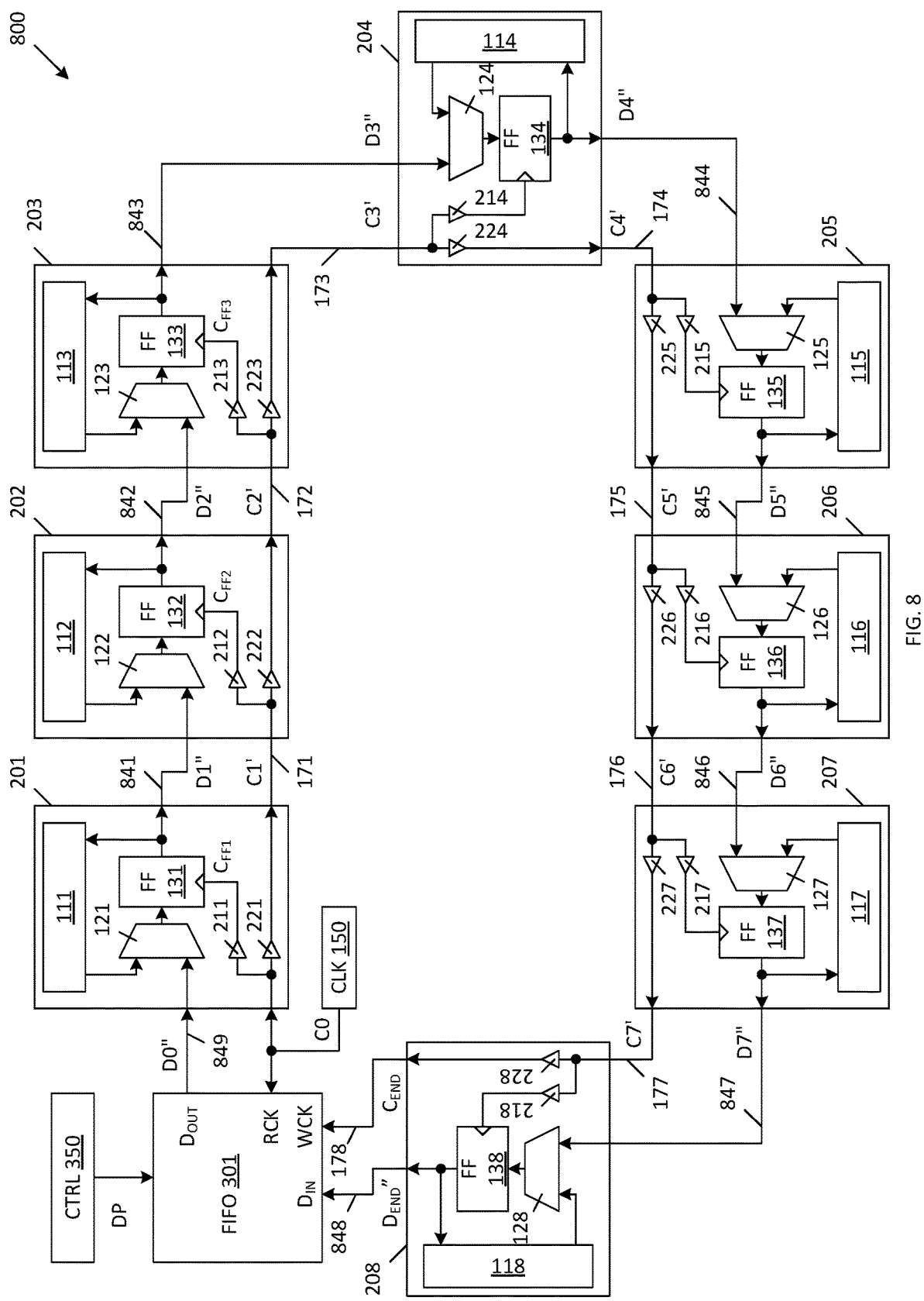
FIG. 8 is a block diagram of a modified cascaded clock ring network that enables estimating the clock delay ($D_{REF}$) in accordance with an alternate embodiment of the present invention.

FIG. 8 is a block diagram of a modified ring network 800 that enables estimating the clock/data delay ($D_{REF}$) associated with the ring network in accordance with an alternate embodiment of the present invention. Because ring network 800 is similar to ring network 300, similar elements in FIGS. 8 and 3 are labeled with similar reference numbers. A main difference between ring networks 800 and 300 is that ring network 800 is modified to include an extra data bus line. Thus, each of the data buses 841-849 has one more data line than the corresponding data buses 141-149 of ring network 300. This additional data line is used to transmit a test data pulse (DP) along the data path from the first processing node 201 through the last processing node 208. Note that the data values of FIG. 8 have been relabeled as D0"-D7" and $D_{END}$" to indicate the addition of the test data pulse to the data buses. Control circuit 350 controls the state of the test data pulse (DP). During normal operation, the test data pulse (DP) has a logic '0' value. However, to estimate the clock delay ($D_{REF}$) associated with ring network 800, control circuit 350 activates the test data pulse (DP) to a logic '1' value by writing this value to resynchronization FIFO circuit 301. At time $T_A$, the source clock signal C0 reads the test data pulse (DP) from resynchronization FIFO circuit 301. The test data pulse (DP) is transmitted on the additional data line of the data path from the first processing node 201 through the last processing node 208, and is received by the resynchronization FIFO 301 on data bus 848 at time $T_B$. Control circuit 350, which is located in close proximity to resynchronizing FIFO circuit 310, calculates the estimated clock delay $D_{REF}$ of cascaded clock ring network 800 to be equal to $T_B$ minus $T_A$. Advantageously, the estimated clock delay $D_{REF}$ can be calculated by during the normal operation of cascaded clock ring network 800.

Figure 9:
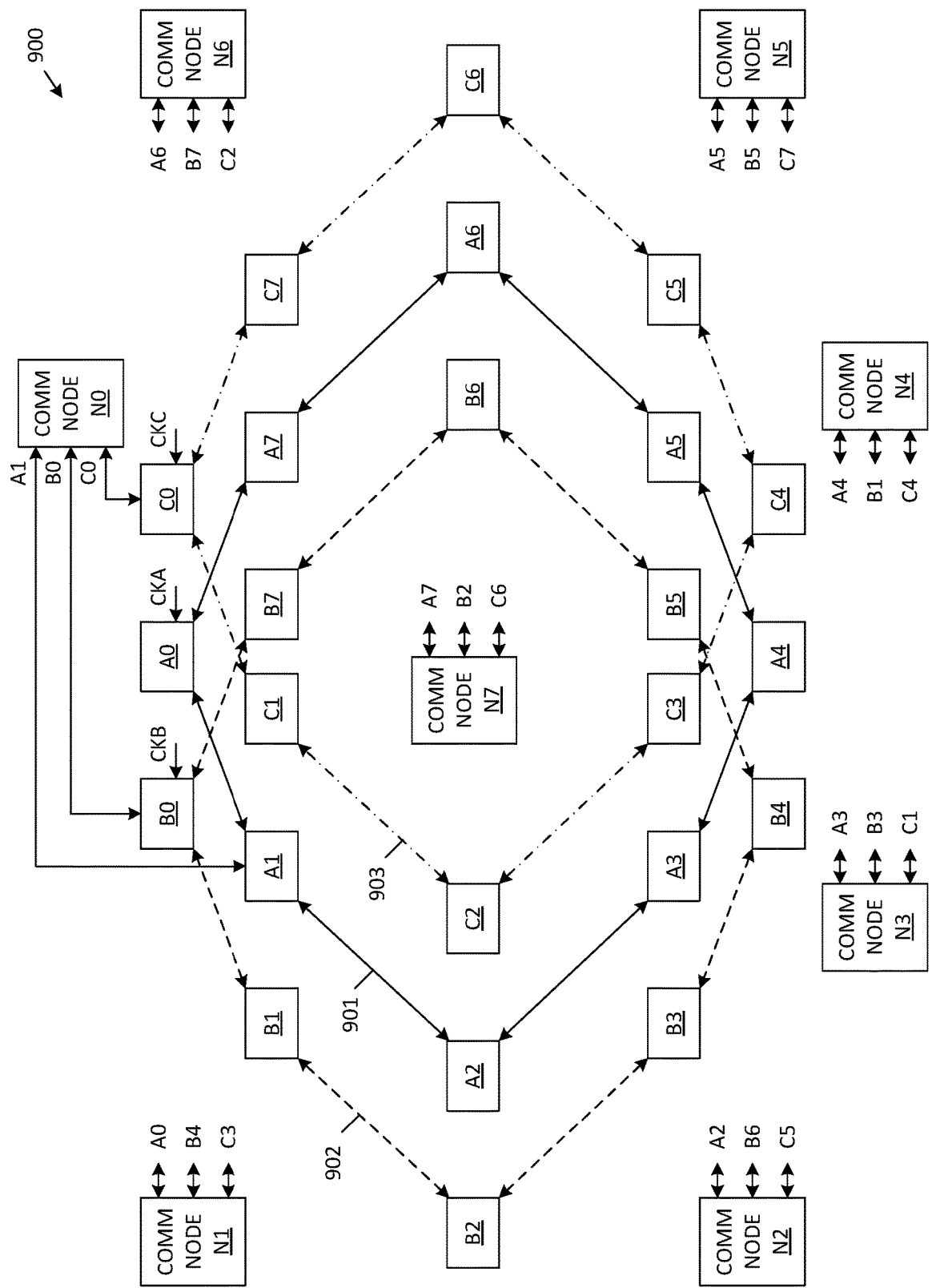
FIG. 9 is a block diagram of a permutated ring network that includes a plurality of parallel cascaded clock ring networks similar to the cascaded clock ring network of FIG. 3 in accordance with another embodiment of the present invention.

FIG. 9 is a block diagram of a permutated ring network 900 that includes a plurality of parallel ring networks 901-903 that are used to transmit data between communication nodes N0-N7. Each of the ring networks 901-903 functions as a communication channel between each of communication nodes N0-N7. Ring network 901 includes data transport stations A0-A7, ring network 902 includes data transport stations B0-B7 and ring network 903 includes data transport stations C0-C7. Each of the parallel ring networks 901, 902 and 903 operates in response to a corresponding clock signal CKA, CKB and CKC, respectively. Permutated ring network 900 is described in more detail on commonly-owned, co-pending U.S. patent application Ser. No. 15/816,374, which is hereby incorporated by reference in its entirety.

In the permutated ring network 900, the clock delay $D_{REF}$ associated with the ring networks 901-903 can be determined during step 512 of the read pulse alignment mode, wherein the transmission of data is stopped on one or more of the parallel ring networks 901-903, while allowing the normal transmission of data to continue on one or more of the parallel ring networks 901-903. For example, the operation of ring network 901 can be temporarily stopped, and a test pulse can then be transmitted on this idle ring network 901 to determine the clock delay $D_{REF}$ associated with the clock signal CKA of this ring network 901 (in accordance with the teachings provided above in connection with FIGS. 7 and/or 8). At the same time, data can continue to be transmitted on the other ring networks 902-903. Similarly, the operation of ring networks 902 and 903 can then be temporarily stopped, and test pulses can then be transmitted on the idle ring networks 902 and 903 to determine the clock delays $D_{REF}$ associated with the clock signals CKB and CKC of these ring networks 902 and 903. At the same time, data can continue to be transmitted on the other ring network 901. Advantageously, at least one ring network may remain in operation while the clock delay ($D_{REF}$) is calculated for the other parallel ring network(s).

After the clock/data delay $D_{REF}$ of cascaded clock ring network 300 is determined using one of the mechanisms described above, control circuit 350 exits the read pulse alignment mode (step 513, FIG. 5). After leaving the read pulse alignment mode, control circuit 350 periodically measures the clock/data delay ($D_{REF}$) associated with the cascaded clock ring network 300 to determine whether this delay appreciably changes over time (e.g., due to variations in operating voltages and/or temperatures). If the delay associated with the clock/data path of the cascaded clock ring network changes too much over time, then read pulse alignment mode can be re-entered, thereby causing the operation of resynchronizing FIFO circuit 301 to be re-calibrated to compensate for these changes, as described in more detail below.

Figure 10:
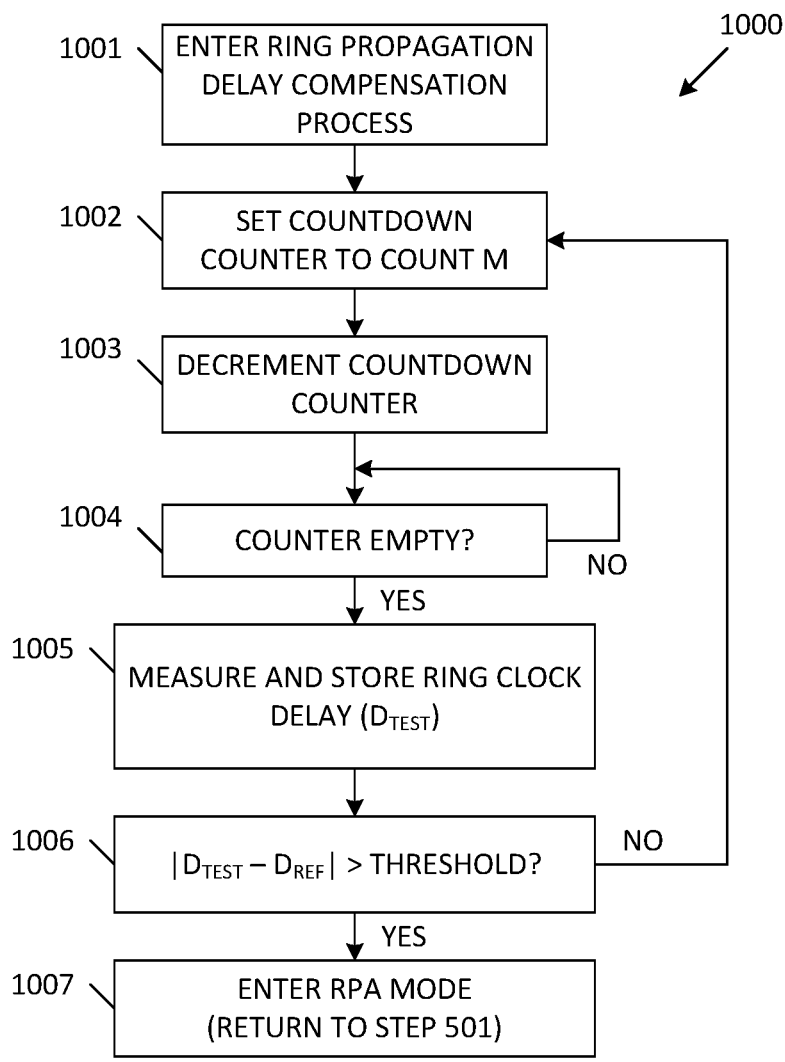
FIG. 10 is a flow diagram of a method for compensating for changes in the delay associated with the clock/data path of the ring network caused by variations in temperature and/or voltage during normal operation.

FIG. 10 is a flow diagram of a method 1000 for compensating for changes in the clock/data delay ($D_{REF}$) associated with the clock/data path of the cascaded clock ring network 300 caused by variations in temperature and/or voltage during normal operation. In step 1001, the ring propagation delay compensation process is started (e.g., from step 513). Initially, control circuit 350 sets a countdown counter 351 (FIG. 3) to a count value of M (step 1002). The countdown counter 351 is then decremented (e.g., in response to the source clock signal C0) (step 1003). If the countdown counter 351 is not empty (step 1004, No branch), processing returns to step 1003, wherein the countdown counter 351 is decremented again. When the countdown counter 351 becomes empty (e.g., after M cycles of the source clock signal C0) (step 1004, Yes branch), the delay associated with the clock/data path of the cascaded clock ring network 300 is re-measured using one of the methods described above, thereby providing a re-tested delay value, $D_{TEST}$ (step 1005). The value M is selected to define the period between re-testing. Because temperature changes and voltage variations due to voltage scaling are very slow events, the period between re-testing can be relatively long (e.g., M=200,000, which provides a re-test period of about 0.1 ms for a source clock frequency of 2 GHz).

The value of M can be as small as the number of clock cycles of the clock/data delay around the ring network 300. In this case, the clock/data delay $D_{REF}$ is monitored/re-tested on an almost constant basis. Alternately, the value of M can be as small as the number of clock cycles required for the temperature of silicon to change enough to change the delay of the ring network 300. The value of M should not be larger than the minimum number of clock cycles required for the delay value $D_{REF}$ to vary by more than a predetermined threshold value, as described in more detail below. When using the permutated ring network 900 (FIG. 9), the value of M is selected such even if each of the cascaded clock ring networks 901-903 is monitored/re-tested sequentially, the system will not fail (i.e., the clock/data delay does not change fast enough to allow any of the cascaded clock ring networks 901-903 to fail while waiting to be monitored/re-tested). Note that other methods for generating an equivalent M cycle delay are possible.

The value of M has an effect on the power consumed by the ring network 300, wherein larger values of M result in lower power consumption.

Although the examples provided herein describe a single clock delay ($D_{TEST}$) measurement, it is understood that multiple clock delay ($D_{TEST}$) measurements may be taken, and the average of these multiple measurements may be used to represent the clock delay ($D_{TEST}$) value (particularly if the clock jitter is greater than the resolution of the measurements).

The previously determined clock/data delay $D_{REF}$ is compared with the re-measured clock/data delay $D_{TEST}$ (step 1006). If the magnitude of the difference between the delays $D_{REF}$ and $D_{TEST}$ (i.e., $|D_{TEST}-D_{REF}|$) is greater than a predetermined threshold (step 1006, Yes branch), then the read pulse alignment mode is re-entered (step 1007). That is, processing returns to step 501 of method 500 (FIG. 5). Otherwise (step 1006, No branch), processing returns to step 1002, wherein the countdown counter is set to a count value of M, and the process is repeated.

Note that when the source clock signal C0 has a high frequency and the length of the data/clock bus paths are on the order of millimeters, the variation in the delay associated with the clock/data path of the cascaded clock ring network 300 can be more than several clock cycles long. This variation can result in the read operations being performed near the edges of the valid data windows defined by the re-synchronization FIFO 301. By monitoring and comparing the current clock/data path delay ($D_{TEST}$) against the clock/data path delay measured during the latest execution of the read pulse alignment mode ($D_{REF}$), the control circuit 350 can determine when the activations of read pulses E1_RD to E6_RD of the re-synchronizing FIFO 301 (e.g., the sample point S1) are approaching the edges of the valid data window period (e.g., valid data window period W1), and then adjust the timing of the read pulses to be activated nearer to the center of the valid data windows (by re-entering the read pulse alignment method 500 of FIG. 5). In the example of FIG. 6, the valid data window W1 has a width of 6 cycles of the source clock signal C0, and the read pulse S1 is initially located near the center of this valid data window W1. In one embodiment, if the difference between the clock/data path delay $D_{TEST}$ and the previously determined clock/data path delay $D_{REF}$ (along with the clock jitter) reaches a threshold value of at least two cycles of the source clock signal C0, then the sample point S1 has been shifted near an edge of the valid data window W1. In this case, re-entering the read pulse alignment mode 500 will re-center the sample point S1 near the center of the valid data window W1, accounting for the current clock/data path delay $D_{TEST}$.

As described above, the number of entries N in FIFO memory 400 establishes the width of the data window during which the data values written to FIFO memory 400 remain valid. The number of entries N (i.e., the width of the data window) is determined by the anticipated maximum phase drift between the clock signals $C_{END}$ and C0 due to clock voltage and temperature variations expected to occur over a predetermined time period during normal operating conditions, as well as the expected relative jitter of the two clock signals $C_{END}$ and C0 (i.e., the maximum expected value of $|D_{TEST}-D_{REF}|$ over M cycles of the source clock signal C0). The number of entries N is large enough to provide a valid data window W1 having a width large enough to allow the read sample point for each read operation of FIFO 400 to fall within the valid data window W1 over the delay test period (M cycles). By using the delay compensation method 1000, fewer entries are required in FIFO 400 to cover a wide range of operating conditions. Fewer FIFO entries advantageously results in less chip layout area used and lower latency.

In general, the required number of entries N is related to source clock frequency, jitter between source clock signal C0 and end clock signal $C_{END}$ and the possible variation in the delay that exists along the clock/data path of the ring network 300 (e.g., due to changing environmental conditions, such as temperature, source clock frequency and the system supply voltage). In one embodiment, each of the processing nodes 201-208 is located on the same integrated circuit chip, such that the possible variation in the clock/data path delay is relatively small (because all of the processing nodes 201-208 will experience similar environmental conditions), and a relatively small number of entries (e.g., N is less than or equal to 8) may be used by FIFO memory 400. In another embodiment, one or more of the processing nodes 201-208 may be located on different integrated circuit chips (and/or different integrated circuit boards), such that the jitter and possible variation in the clock/data delay path is relatively large (because different processing nodes may be exposed to different environmental conditions). In such an embodiment, a relatively large number of entries may be required by FIFO memory 400.

Figure 11:
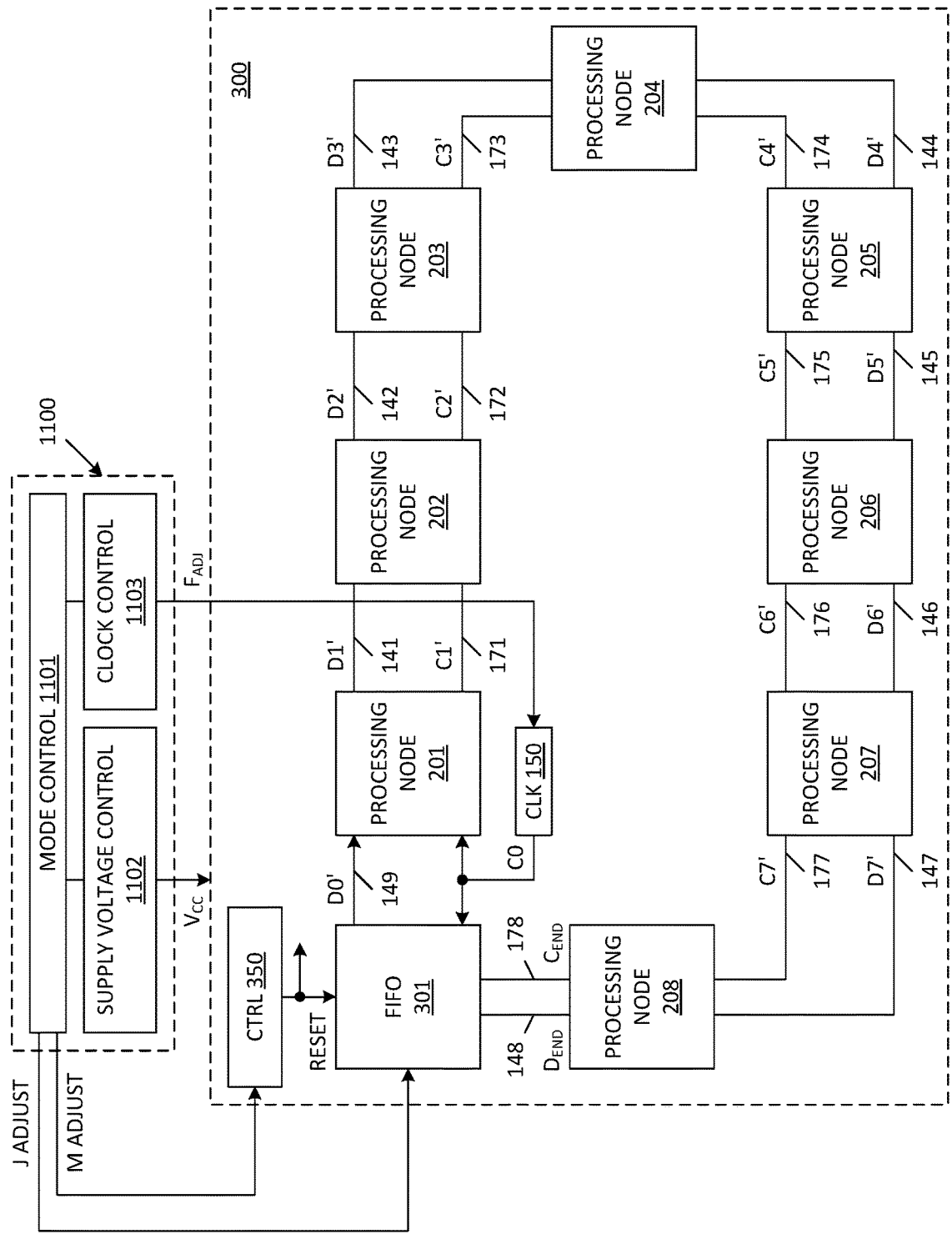
FIG. 11 is a block diagram of a frequency-voltage scaling system, which is used in combination with the cascaded ring network of FIG. 3 in accordance with one embodiment of the present invention

One advantage provided by the use of resynchronizing FIFO memory 301 is enabling seamless, robust operation in a frequency-voltage scaling system, while providing a limited latency penalty. FIG. 11 is a block diagram of a frequency-voltage scaling system 1100, which is used in combination with the cascaded clock ring network 300 (FIG. 3) in accordance with one embodiment of the present invention. Frequency-voltage scaling system 1100 includes mode control circuit 1101, supply voltage control circuit 1102 and clock frequency control circuit 1103. As described in more detail below, mode control circuit 1101 is able to adjust the performance of the cascaded clock ring network 300 by controlling various operating parameters within the cascaded clock ring network 300. More specifically, mode control circuit 1101 transmits voltage control signals to supply voltage control circuit 1102, thereby causing supply voltage control circuit 1102 to adjust the supply voltage $V_{CC}$ used to operate the above-described circuit elements of cascade ring network 300. In one embodiment, supply voltage control circuit 1102 can adjust the supply voltage $V_{CC}$ from a low value of about 0.5 Volts to a high value of about 1.2 Volts (assuming that cascaded clock ring network 300 is fabricated using an advance process node below 20 nm).

Mode control circuit 1101 also transmits frequency control signals to clock frequency control circuit 1103. In response, clock frequency control circuit 1103 transmits a frequency adjustment signal $F_{ADJ}$ to the clock source 150, thereby causing the clock source 150 to adjust the frequency of the source clock signal C0. In one embodiment, the frequency of the source clock signal C0 can be adjusted from a low frequency on the order of a hundred MHz to a high frequency on the order of a few GHz. In an alternate embodiment, clock frequency control circuit 1103 can be modified to generate the source clock signal C0 having the desired frequency (and transmit this source clock signal C0 to clock source 150 for distribution).

The purpose of the frequency-voltage scaling is to minimize power requirements for a given workload performance requirement. For example, different operating modes, such as idle, standby, sleep, deep sleep, nominal, high performance, maximum performance, can be implemented using different frequencies and voltages.

In accordance with one embodiment, mode control circuit 1101 also provides a J-value adjustment message (J_ADJUST), which is provided to re-synchronization FIFO circuit 301. In response, re-synchronization FIFO circuit 301 causes the value of J stored in the J-value register 425 to be modified. In one embodiment, the value of J is adjusted as a function of the frequency of the source clock signal C0 to minimize the latency of FIFO circuit 301 as a function of frequency.

In accordance with another embodiment, mode control circuit 1101 also provides an M-value adjustment message (M_ADJUST), which is provided to control circuit 350. In response, control circuit 350 causes the count value M stored by countdown counter 351 to be adjusted. In one embodiment, the value of M is adjusted as a function of the frequency of the source clock signal C0 and the supply voltage $V_{CC}$, thereby advantageously allowing for different periods for testing for changes in the clock/data path delay.

As the operating voltage and source clock frequency are changed to adjust to performance requirements, the read pulse alignment mode described above (FIG. 5) can be re-entered to re-synchronize the transfer of data from the last processing node 208 to the first processing node 201 and re-center the read pulses within the valid data window. In the absence of re-synchronizing FIFO circuit 301, a much more complicated system (requiring many more FIFO entries) would be required to allow for the resynchronization of a cascaded clock ring network over such a wide range of operating voltages and source clock frequencies.

As long as the rate of change of the delay delta caused by the rate of the voltage/frequency adjustment is less than the sampling and response rate associated with the cascaded clock ring network 300, the mode control circuit 1101 can operate the cascaded ring network without failure. If the voltage or frequency is changed so quickly that the ring delay change causes the read clock transition and write data transition to align in the unknown region where the setup and hold times of the flip-flops are not met, before the $D_{TEST}$ measurement can be taken to determine whether the threshold has been exceeded, there will be data corruption on the data bus. Additionally, if the threshold has been exceeded and detected but the voltage and/or frequency changes so quickly that before the read pulse can be realigned, the read clock transition and write data transition clock are pushed to the unknown region, there will be data corruption on the bus.

Figure 12:
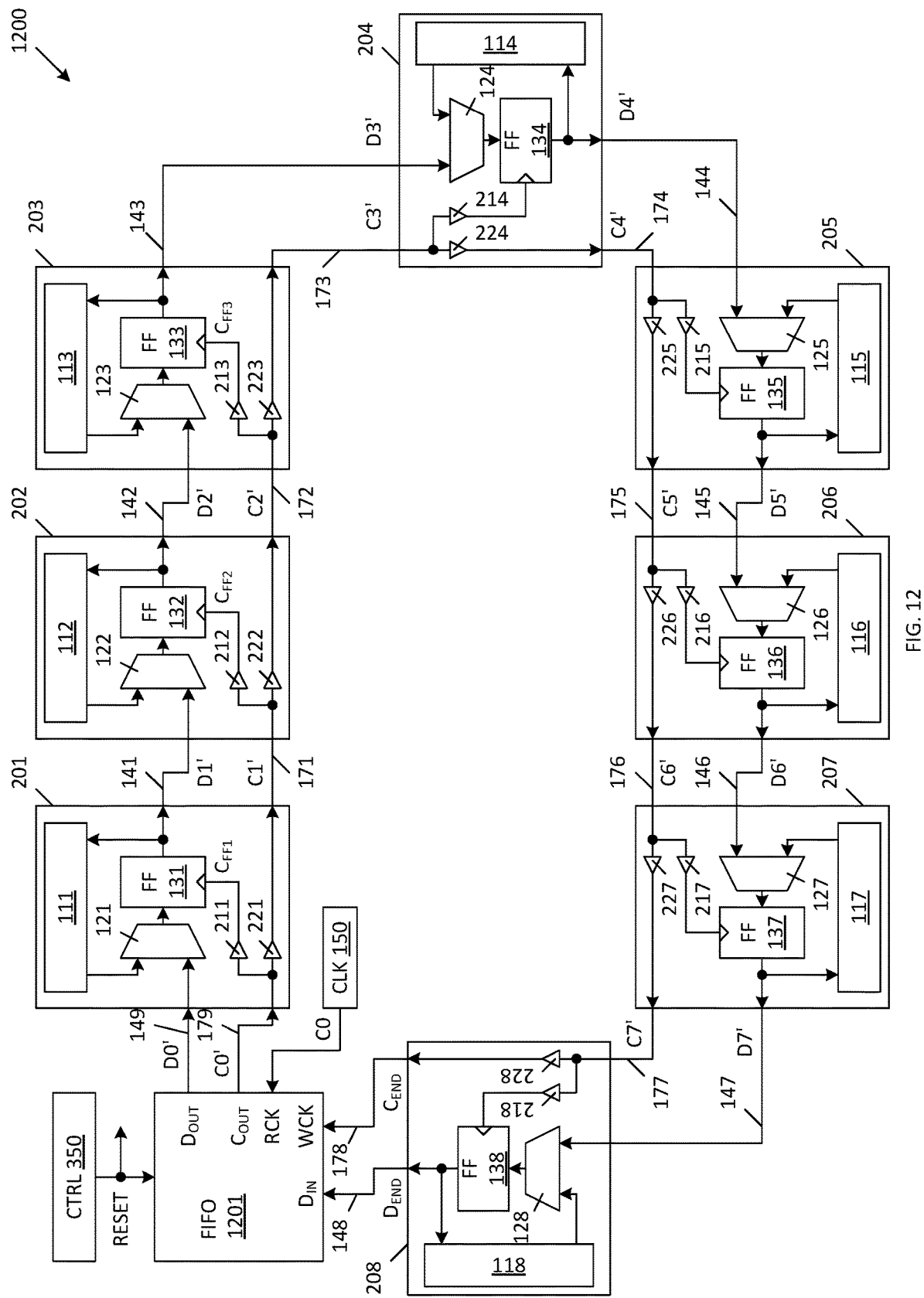
FIG. 12 is a block diagram of a cascaded clock ring network in accordance with an alternate embodiment of the present invention.

FIG. 12 is a block diagram of a cascaded clock ring network 1200 in accordance with an alternate embodiment of the present invention. Because the cascaded clock ring network 1200 of FIG. 12 is similar to the cascaded clock ring network 300 of FIG. 3, similar elements in FIGS. 3 and 12 are labeled with similar reference numbers. In the cascaded clock ring network 300 of FIG. 3, the resynchronizing FIFO circuit 301 is located in close proximity with the first processing node 201, such that the resynchronizing FIFO circuit 301 and the first processing node 201 receive the source clock signal C0 without any significant delay (i.e., the resynchronizing FIFO circuit 301 and the first processing node 201 receive the 'same' source clock signal C0). In the cascaded clock ring network 1200 of FIG. 12, the resynchronizing FIFO circuit 1201 does not need to be located in close proximity with the first processing node 201. In the example of FIG. 12, the signal delay from the resynchronizing FIFO circuit 1201 to the first processing node 201 may be greater than the $T_{CO}-T_{SU}-T_{C2O}$, wherein $T_{CO}$ is the period of the source clock signal C0, $T_{SU}$ is the flip-flop setup time, and $T_{C2O}$ is the flip-flop clock-to-out time.

Figure 13:
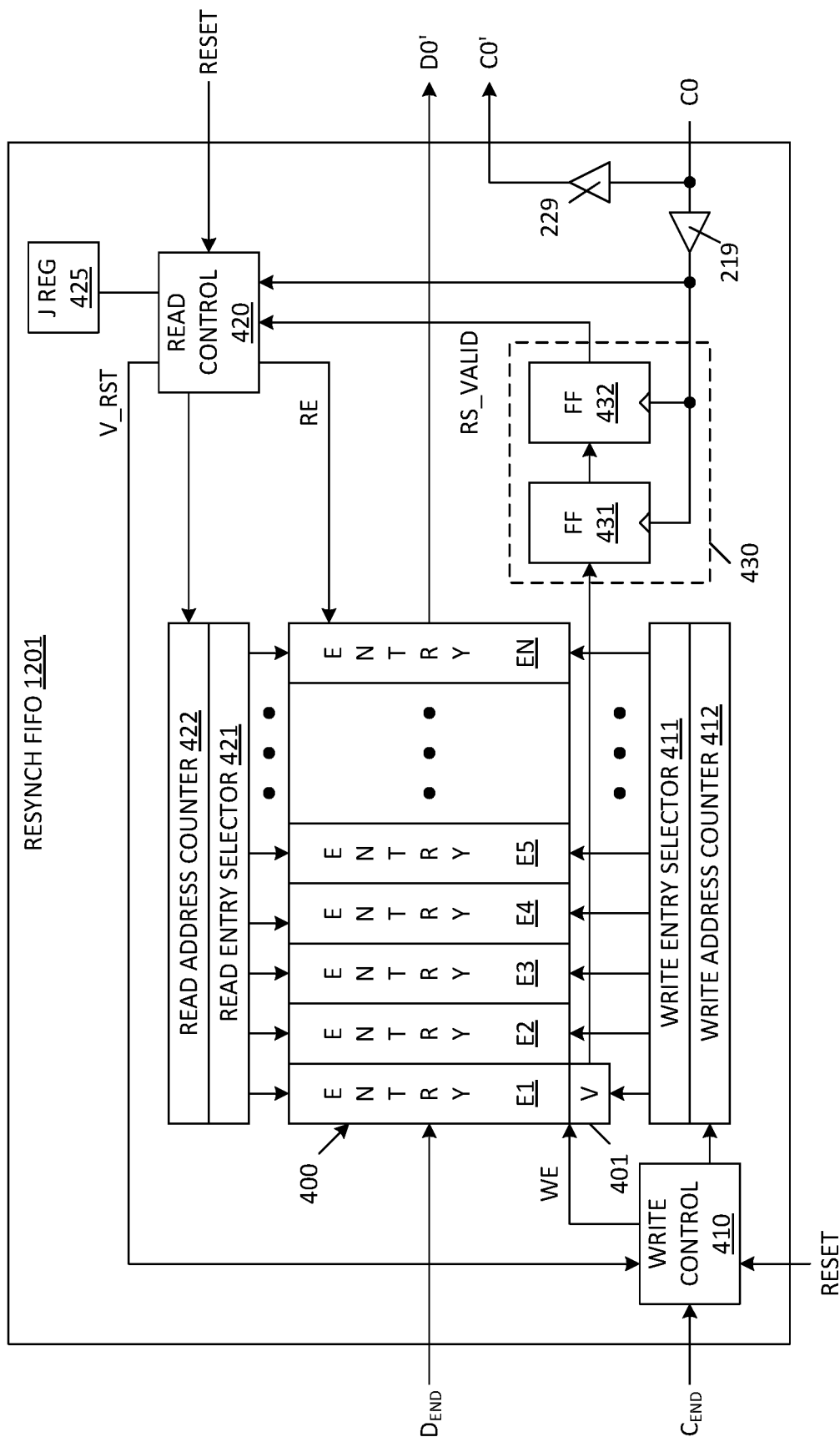
FIG. 13 is a block diagram illustrating the general structure of a resynchronizing FIFO circuit included in the cascaded clock ring network of FIG. 12 in accordance with one embodiment of the present invention.

FIG. 13 is a block diagram of the resynchronizing FIFO circuit 1201 of FIG. 12 in accordance with one embodiment of the present invention. Because the resynchronizing FIFO circuit 301 of FIG. 4 is similar to the resynchronizing FIFO circuit 1201 of FIG. 13, similar elements in FIGS. 4 and 13 are labeled with similar reference numbers. In addition to the above-described elements of resynchronizing FIFO circuit 301, the resynchronizing FIFO circuit 1201 includes a clock driver circuit 219 (which is similar to the above described clock driver circuits 211-218) and a clock driver circuit 229 (which is similar to the above described clock driver circuits 221-228). The characteristics of the clock driver circuits 219 and 229 are selected such that the output clock signal C0' provided by clock driver circuit 229 has a predetermined phase relationship with respect to the data values D0' read from resynchronizing FIFO 1201. As a result, the first processing node 201 receives the data values D0' (on data bus 149) and the corresponding clock signal C0' (on clock bus 179) in the same manner as the other processing nodes 202-208. Thus, any delays introduced to the D0' and C0' signals due to the distance from the resynchronizing FIFO circuit 1200 to the first processing node 201 are approximately the same, thereby maintaining the desired phase relationship between the D0' and C0' signals at the processing node 201. Although the invention has been described in connection with several embodiments, it is understood that this invention is not limited to the embodiments disclosed, but is capable of various modifications, which would be apparent to a person skilled in the art. Accordingly, the present invention is limited only by the following claims.

I claim:

1. A cascaded clock ring network comprising:
   a clock signal path that transmits a source clock signal through a plurality of series-connected processing nodes, from a first processing node to a last processing node, wherein the last processing node provides the transmitted source clock signal as an end clock signal;
   a data path that transmits data values through the plurality of processing nodes in response to the transmitted source clock signal, from the first processing node to the last processing node, wherein the last processing node provides the transmitted data values as end data values;
   a first-in first-out (FIFO) memory that writes the end data values in response to the end clock signal, and reads the end data values previously written to the FIFO memory to the first processing node in response to the source clock signal; and
   a synchronizing circuit that ensures a plurality of end data values are initially written into the FIFO memory before an end data value is read from the FIFO memory.

2. The cascaded clock ring network of claim 1, wherein the FIFO memory stores each of the end data values for a valid data window period having a duration equal to a plurality of cycles of the source clock signal.

3. The cascaded clock ring network of claim 2, wherein the FIFO memory includes a plurality of FIFO entries, wherein the number of FIFO entries defines a duration of the valid data window period.

4. The cascaded clock ring network of claim 3, wherein the valid data window period corresponds with a period of the source clock signal multiplied by the number of FIFO entries.

5. The cascaded clock ring network of claim 1, wherein the FIFO memory includes 8 or fewer entries.

6. The cascaded clock ring network of claim 1, wherein the synchronizing circuit includes:
   a first flip-flop having an input coupled to receive a valid bit that is asserted when an end data value is written to the FIFO memory; and
   a second flip-flop coupled in series with the first flip-flop, wherein the valid bit is transferred through the first and second flip-flops in response to the source clock signal.

7. The cascaded clock ring network of claim 6, further comprising a read control circuit coupled to receive the asserted valid bit provided by the second flip-flop, wherein the read control circuit initiates read operations to the FIFO memory in response to the asserted valid bit.

8. The cascaded clock ring network of claim 7, wherein the read control circuit waits a predetermined number of one or more cycles to initiate read operations after receiving the asserted valid bit.

9. The cascaded clock ring network of claim 8, wherein the predetermined number of one or more cycles is selected to ensure the read operations are initiated near a center of a valid data window period during which the end data values are stored in the FIFO memory.

10. The cascaded clock ring network of claim 1, further comprising circuitry for measuring a delay associated with the clock signal path.

11. The cascaded clock ring network of claim 10, wherein the circuitry comprises a second clock signal path having the same design as the clock signal path.

12. The cascaded clock ring network of claim 1, further comprising circuitry for measuring a delay associated with the data path.

13. The cascaded clock ring network of claim 12, wherein the circuitry comprises a data signal line having the same design as the data signal path.

14. The cascaded clock ring network of claim 1, further comprising further comprising a control circuit for periodically measuring a delay associated with the clock signal path or the data path, and determining whether the periodically measured delays change by more than a threshold value.

15. The cascaded clock ring network of claim 1, further comprising a clock controller circuit that adjusts the frequency of the source clock signal.

16. The cascaded clock ring network of claim 15, further comprising a supply voltage control circuit that adjusts a supply voltage used to operate the processing nodes.

17. The cascaded clock ring network of claim 15, further comprising:
   a read control circuit that delays read operations from the FIFO memory by a number of cycles of the source clock signal; and
   a mode control circuit that adjusts the number of cycles of the source clock signal based on the frequency of the source clock signal.

18. A cascaded clock ring network comprising:
   a clock signal path that transmits a source clock signal through a plurality of series-connected processing nodes, from a first processing node to a last processing node, wherein the last processing node provides the transmitted source clock signal as an end clock signal;
   a data path that transmits data values through the plurality of processing nodes in response to the transmitted source clock signal, from the first processing node to the last processing node, wherein the last processing node provides the transmitted data values as end data values; and
   a first-in first-out (FIFO) memory that writes the end data values in response to the end clock signal, and reads the end data values previously written to the FIFO memory to the first processing node in response to the source clock signal, wherein the FIFO memory stores each of the end data values for a valid data window period, the cascaded clock ring network further comprising means for initiating read operations to the FIFO memory near a center of each valid data window period.

19. A cascaded clock ring network comprising:
   a clock signal path that transmits a source clock signal through a plurality of series-connected processing nodes, from a first processing node to a last processing node, wherein the last processing node provides the transmitted source clock signal as an end clock signal;
   a data path that transmits data values through the plurality of processing nodes in response to the transmitted source clock signal, from the first processing node to the last processing node, wherein the last processing node provides the transmitted data values as end data values;

a first-in first-out (FIFO) memory that writes the end data values in response to the end clock signal, and reads the end data values previously written to the FIFO memory to the first processing node in response to the source clock signal; and a control circuit for periodically measuring a delay associated with the clock signal path or the data path, and determining whether the periodically measured delays change by more than a threshold value, wherein the control circuit is configured to reset the FIFO memory in response to determining that the periodically measured delays change by more than the threshold value.

20. A cascaded clock ring network comprising:

a clock signal path that transmits a source clock signal through a plurality of series-connected processing nodes, from a first processing node to a last processing node, wherein the last processing node provides the transmitted source clock signal as an end clock signal;

a data path that transmits data values through the plurality of processing nodes in response to the transmitted source clock signal, from the first processing node to the last processing node, wherein the last processing node provides the transmitted data values as end data values;

a first-in first-out (FIFO) memory that writes the end data values in response to the end clock signal, and reads the end data values previously written to the FIFO memory to the first processing node in response to the source clock signal; and a control circuit for periodically measuring a delay associated with the clock signal path or the data path, and determining whether the periodically measured delays change by more than a threshold value, wherein the control circuit includes an adjustable counter for selecting the period of the periodically measured delays.

21. A method of operating a cascaded clock ring network comprising:

transmitting a source clock signal on a clock signal path through a plurality of series-connected processing nodes, from a first processing node to a last processing node, wherein the last processing node provides the transmitted source clock signal as an end clock signal;

transmitting data values on a data path through the plurality of processing nodes in response to the transmitted source clock signal, from the first processing node to the last processing node, wherein the last processing node provides the transmitted data values as end data values;

writing the end data values to a first-in first-out (FIFO) memory in response to the end clock signal; and reading the end data values previously written to the FIFO memory to the first processing node in response to the source clock signal; and synchronizing the writing and reading of the end data values to ensure that a plurality of the end data values are initially written into the FIFO memory before an end data value is read from the FIFO memory.

22. The method of claim 21, further comprising storing each of the end data values in the FIFO memory for a valid data window period having a duration equal to a plurality of cycles of the source clock signal.

23. The method of claim 22, further comprising writing the end data values to the FIFO memory in a wrap-around manner, wherein a number of entries of the FIFO memory defines a duration of the valid data window period.

24. The method of claim 21, wherein the synchronizing includes:

activating a valid indicator upon writing one of the end data values into an entry of the FIFO memory; and transmitting the activated valid indicator through a plurality of flip-flops in response to the source clock signal, thereby providing a resynchronization valid indicator.

25. The method of claim 24, further comprising initiating read operations to the FIFO memory in response to the resynchronization valid indicator.

26. The method of claim 25, further comprising;

detecting the resynchronization valid indicator;

delaying the initiating of read operations to the FIFO memory by one or more cycles of the source clock signal upon detecting the resynchronization valid indicator; and then initiating read operations to the FIFO memory after the delaying.

27. The method of claim 26, further comprising selecting a number of the one or more cycles to ensure the read operations are initiated near a center of a valid data window period during which the end data values are stored in the FIFO memory.

28. The method of claim 21, further comprising:

periodically measuring a delay associated with the clock signal path or the data path;

determining whether the periodically measured delay changes by more than a threshold value; and upon determining that the periodically measured delay changes by more than the threshold value, re-synchronizing the writing and reading of the end data values within the FIFO memory.

29. The method of claim 28, further comprising changing a period at which the delay is periodically measured.

30. The method of claim 21, further comprising:

changing an operating voltage of the cascaded clock ring network and/or a frequency of the source clock signal; and then re-synchronizing the writing and reading of the end data values within the FIFO memory.

31. A method of operating a cascaded clock ring network comprising:

transmitting a source clock signal on a clock signal path through a plurality of series-connected processing nodes, from a first processing node to a last processing node, wherein the last processing node provides the transmitted source clock signal as an end clock signal;

transmitting data values on a data path through the plurality of processing nodes in response to the transmitted source clock signal, from the first processing node to the last processing node, wherein the last processing node provides the transmitted data values as end data values;

writing the end data values to a first-in first-out (FIFO) memory in response to the end clock signal; and reading the end data values previously written to the FIFO memory to the first processing node in response to the source clock signal;

storing each of the end data values in the FIFO memory for a valid data window period; and initiating read operations to the FIFO memory near a center of each valid data window period.

32. A method of operating a ring network having a plurality of parallel cascaded clock ring networks comprising:
synchronizing the transmission of data from a last processing node in a first cascaded clock ring network with a first processing node in the first cascaded clock ring network, and simultaneously transmitting data on a parallel second cascaded clock ring network in a normal operating mode.

33. The method of claim 32, further comprising:
synchronizing the transmission of data from a last processing node in the second cascaded clock ring network with a first processing node in the second cascaded clock ring network, and simultaneously transmitting data on the parallel first cascaded clock ring network in a normal operating mode.

* * * * *